US008612390B2

(12) United States Patent
Wang et al.

(10) Patent No.: US 8,612,390 B2
(45) Date of Patent: Dec. 17, 2013

(54) LIGHTWEIGHT CACHING OF TRANSACTION LOG FOR SEQUENTIAL ACCESS

(75) Inventors: Rui Wang, Redmond, WA (US); Peter Byrne, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 60 days.

(21) Appl. No.: 13/098,647

(22) Filed: May 2, 2011

(65) Prior Publication Data

US 2012/0284295 A1    Nov. 8, 2012

(51) Int. Cl.
*G06F 17/00*    (2006.01)
*G06F 7/00*    (2006.01)

(52) U.S. Cl.
USPC ........... 707/640; 707/648; 707/649; 711/161; 711/162

(58) Field of Classification Search
None
See application file for complete search history.

(56) References Cited

U.S. PATENT DOCUMENTS

| | | | |
|---|---|---|---|
| 5,530,855 A | 6/1996 | Satoh | |
| 5,729,742 A | 3/1998 | Harbinski | |
| 5,890,154 A | 3/1999 | Hsiao | |
| 6,321,234 B1 * | 11/2001 | Debrunner | 1/1 |
| 6,721,765 B2 * | 4/2004 | Ghosh et al. | 1/1 |
| 6,728,879 B1 | 4/2004 | Atkinson | |
| 6,732,124 B1 * | 5/2004 | Koseki et al. | 1/1 |
| 6,732,137 B1 | 5/2004 | Dearing | |
| 7,076,508 B2 | 7/2006 | Bourbonnais | |
| 7,937,367 B2 * | 5/2011 | Watanabe et al. | 707/640 |
| 2004/0010499 A1 * | 1/2004 | Ghosh et al. | 707/100 |
| 2005/0251625 A1 * | 11/2005 | Nagae et al. | 711/129 |
| 2007/0245095 A1 * | 10/2007 | Watanabe et al. | 711/150 |
| 2008/0133615 A1 | 6/2008 | Bradshaw | |
| 2008/0208891 A1 * | 8/2008 | Wang et al. | 707/102 |
| 2008/0301256 A1 * | 12/2008 | McWilliams et al. | 709/214 |
| 2009/0254572 A1 * | 10/2009 | Redlich et al. | 707/10 |
| 2010/0100529 A1 * | 4/2010 | Erofeev | 707/610 |

OTHER PUBLICATIONS

MSDN, "Introduction to Transaction Logs," Retrieved Dec. 22, 2010, http://msdn.microsoft.com/en-us/library/ms190925.aspx.

* cited by examiner

*Primary Examiner* — Angelica Ruiz
(74) *Attorney, Agent, or Firm* — Workman Nydegger (57) ABSTRACT

Searching cached log blocks. A method includes performing a first search on cached log blocks for a log block having a first log block ID. The log blocks are cached and organized into sequentially ordered log buffers in memory. Adjacent sequentially ordered log buffers are double linked to each other. Each log buffer includes a complete range of log blocks from a starting log block ID to an ending log block ID. As part of the first search one or more links are followed, forward and/or backward, to one or more other log buffers. The method may further include determining that the first log block is not found by following one or more links forward and/or backward to one or more other log buffers and as a result, follow one or more covering pointers to one or more log buffers to search for the first log block.

21 Claims, 3 Drawing Sheets

LIGHTWEIGHT CACHING OF TRANSACTION LOG FOR SEQUENTIAL ACCESS

BACKGROUND

Background and Relevant Art

Computers and computing systems have affected nearly every aspect of modern living. Computers are generally involved in work, recreation, healthcare, transportation, entertainment, household management, etc. Computer systems may store data in a database management system (DBMS).

DBMSs perform various writes and reads of data to and from databases. Additionally, DBMSs have various features to ensure the integrity of data written to the databases in the event of catastrophic failure. A DBMS can generate a transaction log of changes for a database and write it to disk sequentially in units of log blocks. Different log blocks may be of different sizes. The transaction log is read from disk in units of log chunks. Each log chunk includes at least one, and often multiple, consecutive log blocks such that each log chunk includes a complete range of log blocks. Different log chunks may have different sizes.

The transaction log is exploited by different users for various reasons. For example, the transaction log may be used to recover the database after a server crash, to scale out the read workload via transactional replication, to maintain a hot standby secondary server via log capture at the primary server, continuous redo recovery at the secondary server, etc.

Due to the cost of reading the transaction log from disk, after a log chunk is read from disk by a user, it is beneficial to cache this log chunk in memory as it may be consumed repeatedly by the same or another user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for searching cached log blocks. The method includes performing a first search on cached log blocks for a log block having a first log block ID. The log blocks are cached and organized into sequentially ordered log buffers in memory. Adjacent sequentially ordered log buffers are double linked to each other. Each log buffer includes a complete range of log blocks from a starting log block ID to an ending log block ID. As part of the first search one or more links are followed, forward and/or backward, to one or more other log buffers. The method may further include determining that the first log block is not found by following one or more links forward and/or backward to one or more other log buffers and as a result, follow one or more covering pointers to one or more log buffers to search for the first log block.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
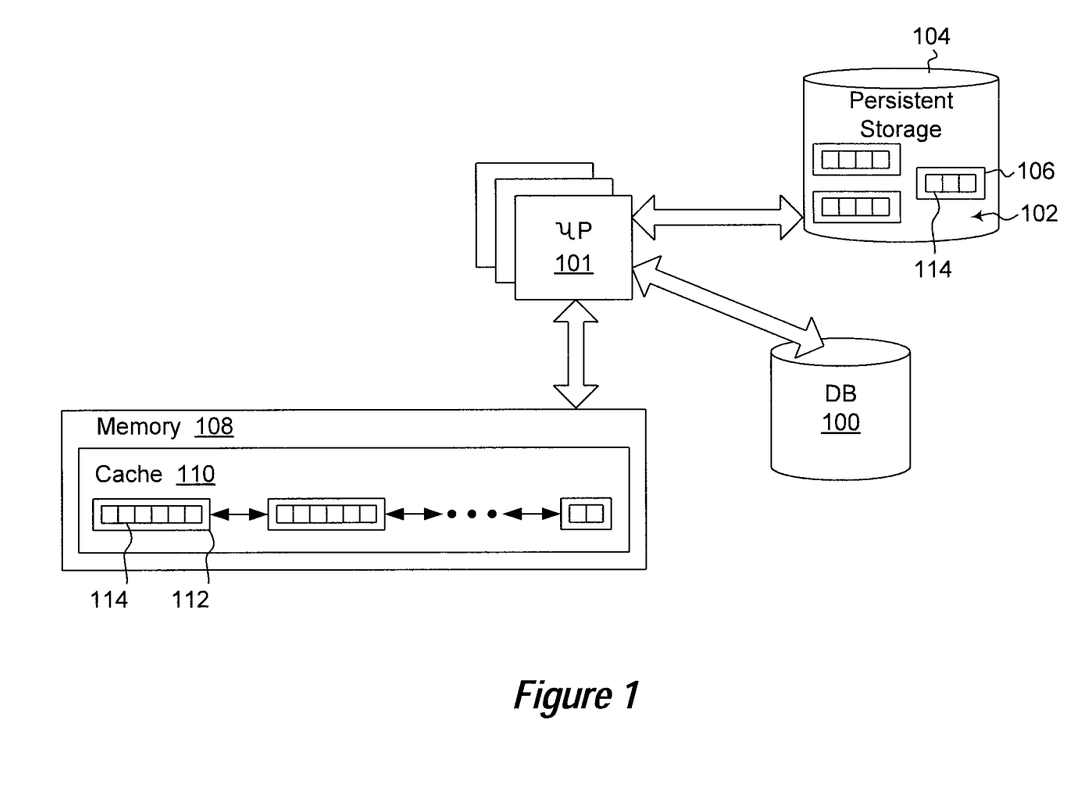
FIG. 1 illustrates an example RDMS including a log and a cache of the log.

Referring now to FIG. 1, a DBMS system is illustrated. FIG. 1 illustrates a database 100. The database 100 may be implemented in a number of different ways. For example, often databases are stored on some persistent storage device, such as hard drives, flash drives, tape drives, etc. However, some databases may be implemented in volatile storage such as DRAM or other volatile memory devices.

The DBMS may be implemented by using one or more computer implemented modules implemented using one or more microprocessors 101. In particular, computer executable instructions can be loaded into memory 108 and executed by one or more of the processor 101 to implement modules that implement the functionality of the DBMS. The DBMS can read from and write to the database 100. Operations to the database 100 can be recorded in a log 102, typically stored on persistent storage 104. Persistent storage 102 may be one or more of a number of different storage devices. Commonly, hard disk drives, flash drives, etc. are used for persistent storage 104. However, other devices may be used additionally or alternatively, such as tape drives, CD and/or DVD drives, or any of a number of other types of storage.

As noted above, due to the cost of reading the transaction log 102 from persistent storage 104, after a log chunk (referred to herein generally as log chunk 106 even though a plurality of log chunks are illustrated in FIG. 1) is read from persistent storage 104 by a user, it is beneficial to cache this log chunk 106 in memory 108 as it may be consumed repeatedly by the same or another user. Log chunks 106 are cached as log buffers in memory 108. Log buffers are referred to herein generally at 112 even though a plurality of log buffers are shown. However, different cached log chunks cached as log buffers 112 may contain overlapping log blocks. Log blocks are referred to generally at 114 even though a plurality of log blocks are shown. Additionally, most users consume the transaction log 102 sequentially in most cases. Given this, it would be useful to implement efficient methods of searching log buffers 112.

Thus some embodiments implement a lightweight caching mechanism for the transaction log 102. Some embodiments of the caching mechanism allow for low search cost and ensure search success if a log block 114 is included in any cached log chunk 106. In one embodiment, after a log chunk 106 stored on persistent storage 104 is read into a log buffer 112, the log buffer 112 (which contains one or multiple consecutive log blocks 114) is inserted into a double-linked list as illustrated by the bi-directional arrows between the log buffers 112 illustrated in FIG. 1. The double linked list is sorted by the ID of the first log block 114 in each log buffer 112. This will be illustrated with more detail in FIG. 2.

The last access point in this list is tracked, such that the next search in this list starts from the last access point. In some embodiments, tracking the last access point may be performed simply by storing an identifier identifying the last accessed buffer 112 as a pointer in the memory 108 or some other storage location.

Embodiments further track covering relations among log buffers 112, where covering relations refer to overlap of log buffers 112. In particular, a log buffer 112 covers another log buffer 112 if it includes all of the log blocks 114 of the other log buffer 112. For example consider a first log buffer 112 with log blocks 30 through 120 and a second log buffer 112 with log blocks 40 through 50. Because the first log buffer 112 includes all of the log blocks of the second log buffer 112, the first log buffer 112 is a covering log buffer 112 for the second log buffer 112. When a search starting from the last access point following the list's links fails, embodiments can continue searching certain covering log buffers, so that the search can find a log block 114 if it is contained in any log buffer 112.

After a log chunk 106 is read into a log buffer 112, the log chunk 106 is not split into individual log blocks and cached individually. This avoids the cost of memory allocation for individual log blocks 114. Instead, the whole log chunk 106 is cached and inserted into a log buffer 112 into the cache 110.

Log buffers 112 are linked into a double-linked list, which is sorted by the ID of the first log block 114 in each log buffer 112. This sorting avoids traversal of the whole list to find out that a log block 114 is not in the cache 110. In some embodiments, a hash table is not used to index log blocks in the cache 110, as a hash table uses more memory space and has higher data structure overhead, compared to a simple double-linked list.

Embodiments may be implemented where access to cached log buffers is mostly sequential. This means that in many cases, a log block 114 to be accessed is close to the log block 114 lastly accessed in the list. The last access point is tracked. In particular, in some embodiments, a pointer to the most recently accessed log buffer 112 can be referenced to determine where searching should begin based on where a previous search ended. Searching for a log block 114 starts from the last access point and this reduces the search cost, compared to starting from the head or the tail of the list log buffers 112.

Figure 2:
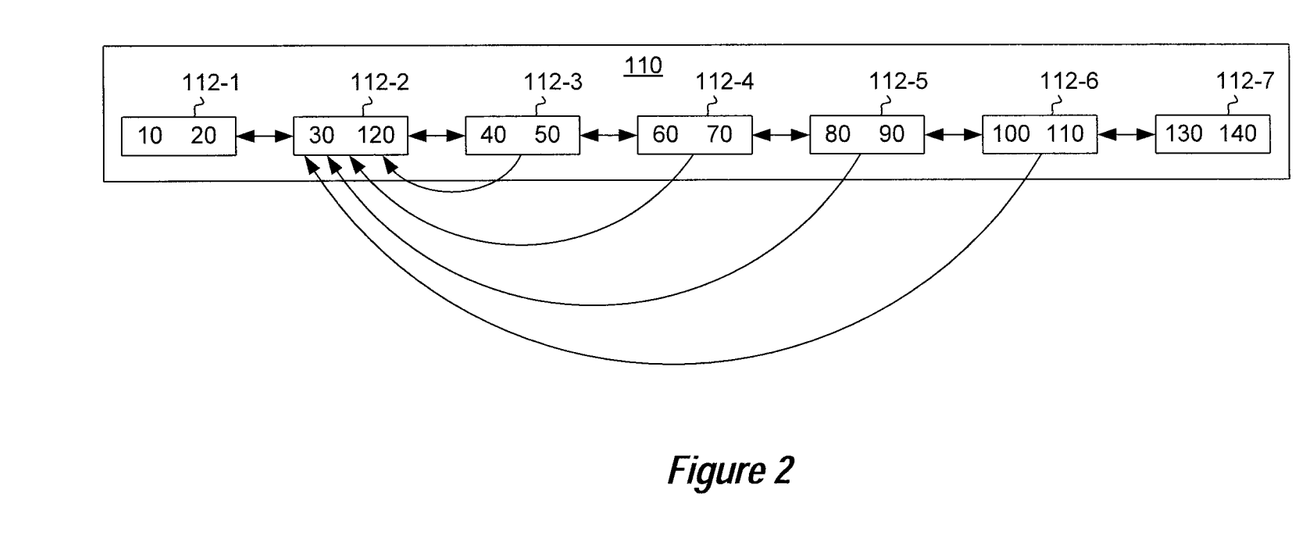
FIG. 2 illustrates linked log buffers in a log cache.

However, a search starting from the last access point as tracked by the pointer, may fail to find a log block 114 even if it is contained in a log buffer 112. For example, consider a list of log buffers, sorted in ascending order of their first log block ID as illustrated in FIG. 2. In particular, the following illustrates the log buffers illustrated in FIG. 2 and the double links between the log buffers: [10, 20]←→[30, 120]←→[40, 50]←→[60, 70]←→[80, 90]←→[100, 110]←→[130, 140], (shown in FIG. 2 specifically as 112-1, 112-2, 112-3, 112-4, 112-5, 112-6, and 112-7 respectively) where a number in the square bracket stands for a beginning or ending log block ID, a square bracket stands for the complete range of log blocks contained in a log buffer 112, and the double arrows represent forward and backward links in the double linked list.

This cache 110 could be filled in the following scenario: the user reads log chunks [10, 20], [30, 39], [40, 50], [60, 70], [80, 90], [100, 110] and [130, 140] into the cache 110; each time when it reads, not enough log is available and so each log buffer 112 contains only a small log range. Later due to memory pressure, the log buffer 112 containing [30, 39] is replaced. The user comes back to read log block 30 again, and this time a larger portion of log is available in a log chunk 106 and so the corresponding log buffer 112-2 contains a larger log range, [30, 120].

Now illustrating an example of searching cached portions of the log 102, suppose the last access point was in log buffer 112-4 with log block range [60, 70] and a search is to be performed for a log block 114 with a log block ID of 95. Thus, the search starts from log buffer 112-4 with a log block range of [60, 70]. As 95 is greater than 70, the search continues to the next log buffer 112-5 with a log block range of [80, 90]. Again, as 95 is greater than 90, the search continues to the next log buffer 112-6 with a log block range of [100, 110]. If covering references are not used, at this point, the search finds that 95 is less than 100 and thus reports that 95 is not found. However, as illustrated, 95 is indeed contained in the log buffer 112-2 with the log range of [30, 120], however a search only following the double linked list's links and utilizing the sorting information is unable to discover this without some other functionality.

Note that if a search always starts from the head of the list, the search will succeed if the log block 114 being searched for is contained in any log buffer 112. For example, in the illustrated example, if a search starts from log buffer 112-1 with a rage of [10, 20] (the head of the double linked list), it will eventually come to log buffer 112-2 with a range of [30, 120] and finds a log block 114 with a log block ID of 95. However, a search always starting from the head of the list, rather than from the last access point, loses the benefit of lower search cost.

However, embodiments can be implemented to maintain low search cost by allowing searching to begin from a last access point while still ensuring search success if a log block 114 exists in a log buffer 112. To ensure search success when starting from the last access point, embodiments maintain covering relations among log buffers. In the previous example, log buffer 112-2 with a log block range of [30, 120] covers log buffer 112-3 with a log block range of [40, 50], log buffer 112-4 with a log block range of [60, 70], log buffer 112-5 with a log block range of [80, 90] and log buffer 112-6 with a log block range of [100, 110]. In the illustrated embodiment, each of the log buffers 112-3, 112-4, 112-5, and 112-6 keeps a pointer to its covering log buffer 112-2. In the preceding example, when the search for a log block with log block ID 95 comes to log buffer 112-6 and fails to find the log block with log block ID 95, it will check the covering log buffers of the previous log buffer 112-5. The covering log buffer of log buffer 112-5 is log buffer 112-2. Thus, the search will check the covering log buffer 112-2 with a log block range of [30, 120] and thus finds the log block with log block ID 95 in this log buffer 112-2.

The following now illustrates a formal description with formal rules and assumptions that may be implemented in some embodiments. A first assumption is that no two log buffers 112 in cache 110 have the same first log block 114 in the double-linked list. This is a reasonable assumption in practice, as reading a log chunk 106 starting from a given log block B from persistent storage 104 is initiated when a user is unable to find log block B in the cache 110. Without loss of generality, for simplicity of presentation of the following example, it can be assumed that the double linked list is sorted in ascending order of the log block ID of the first log block in each log buffer 112. However, embodiments may be implemented where the double linked list is sorted in descending order.

A log buffer [Fa, La] covers another log buffer [Fb, Lb] iff Fa<=Fb and La>=Lb. In other words, the covering log buffer includes all of the log blocks in the log buffer it is covering. A log buffer may be covered by multiple other log buffers. Each log buffer keeps a list of pointers to its covering log buffers, to the extent that they exist, in a covering list. With the assumption that no two log buffers in the double-linked list have the same first log block, if a log buffer [Fa, La] covers another log buffer [Fb, Lb], Fa is smaller than Fb, and [Fa, La] is located before [Fb, Lb] in the list, and further if [Fb, Lb] covers a log buffer [Fc, Lc], then [Fa, La] covers both [Fb, Lb] and [Fc, Lc], and a pointer to [Fa, La] appears in both the covering list of [Fb, Lb] and [Fc, Lc].

The following illustrates an example of inserting log buffer [Fx, Lx] into the cache 110. As Fx is not contained in any existing log buffer 112, [Fx, Lx] is not covered by any existing log buffer 112. Thus, [Fx, Lx] can be inserted into the cache 110. After [Fx, Lx] is inserted, to adjust covering relations of [Fx, Lx] with any covered log buffers, for each log buffer [Fz, Lz] which is located in the list after (not just immediately after) [Fx, Lx] and whose start log block ID Fz is no larger than Lx, embodiments can check if [Fz, Lz] is covered by [Fx, Lx]. If covered, a pointer to [Fx, Lx] is added into [Fz, Lz]'s covering list. As an optimization, some embodiments may remove a covered log buffer [Fz, Lz] from the double liked list, and essentially from the cache 110, if it is not currently being used by the user. If it is still being used, it may not be safe to remove this log buffer.

The following illustrates an example of how a log buffer may be removed from the double linked list. In particular, the following illustrates removing the log buffer [Fx, Lx] illustrated above. In the illustrated embodiment, before [Fx, Lx] is removed from the double linked list, embodiments adjust its covering relations. In particular, in some embodiments all pointers are removed from its covering list. Then, to adjust covering relations of [Fx, Lx] with any covered log buffers, for each log buffer [Fz, Lz] which is located in the list after [Fx, Lx] (including those that are not just immediately after) and whose first log block ID Fz is no larger than Lx, embodiments check if [Fz, Lz] is covered by [Fx, Lx]. If covered, the pointer to [Fx, Lx] are removed from [Fz, Lz]'s covering list.

The following now illustrates an example of how a search for a log block with a log block ID B is performed. In this illustrated example, search begins with a forward traversal, then possibly continues with a backward traversal, and possibly ends with checking some covering log buffers. However, it should be noted that alternative embodiments may begin with a backward traversal, include a possible forward traversal, and possibly following a pointer to a covering log buffer 112.

In the following example, a forward traversal is performed first. For the forward traversal, if a last access point does not exist, the forward traversal starts from the head of the list (e.g. log buffer 112-1 in the example illustrated in FIG. 2). Otherwise, the forward traversal starts from the last access point. At each log buffer [Fz, Lz] encountered during the forward traversal:

if B>= Fz and B<= Lz, terminate search and report "FOUND";
else, if B > Lz, traversal steps to the next log buffer 112 in the list;
else (B < Fz), stop forward traversal.

If the forward traversal steps beyond the tail of the list (e.g. log buffer 112-7 in the example illustrated in FIG. 2), the backward traversal starts from the tail of the list. Otherwise, the backward traversal starts from the log buffer just preceding where the forward traversal was stopped. At each log buffer [Fz, Lz] encountered during the backward traversal:

if B>= Fz and B<= Lz, terminate search and report "FOUND";
else, if B < Fz, traversal steps to the previous log buffer in the list;
else (B > Lz), stop backward traversal.

If a match is not found for B in the forward or backward traversals, embodiments can determine that a log block is not found or check covering log buffers, depending on the conditions. If the backward traversal steps beyond the head of the list, i.e. B is smaller than the first log block ID of all log buffers, the search is terminated and report is made that the log block B is not found. Otherwise, suppose the backward traversal stops at [Fp, Lp], in that Fp is the largest first log block ID which is smaller than B, then embodiments check all covering log buffers of [Fp, Lp], such as for example by checking entries in a covering list for the log buffer with the range [Fp, Lp].

If any covering log buffer contains the log block B, the search is terminated and a report is made that the log block B is found. If the covering log buffers are not found to contain the log block B, then the search is terminated and a report is made that log block B was not found. When a report is made that a log block is not found, embodiments can read a log chunk 106 from the log 102 with the appropriate log block 114.

With this algorithm, as long as the access is mostly sequential and the covering relations occur rare, which is true in practice, the search cost is close to constant, similar to what is achieved by the hash table, but with lower overhead of data structure and less memory space, compared to the hash table. Search is more expensive when it is started and re-started to a point in the list. In this case, search will start the traversal from the head or the tail of the list to reach this point. However, this cost can be amortized by subsequent searches. As long as the number of searches is much greater than the number of traversal steps required at start or restart, the search cost is still close to constant. Rarity of covering relations also implies minor cost of maintaining covering relations when log buffers are inserted or removed.

In the preceding description, embodiments assumed that no two log buffers in the double-linked list have the same first log block. However, embodiments can be implemented where this assumption is relaxed when there is an assumption that a log buffer 112 being inserted is not covered by any existing log buffer 112, and it may be possible that a log buffer 112 being inserted has the same first log block as an existing log buffer 112. An algorithm for inserting a log buffer 112 into the double linked list may be performed so that if a log buffer 112 to be inserted has the same first log block as some existing log buffers, this new log buffer 112 should be inserted before such existing log buffers in the list. In this way, if two log buffers have the same first log block, they nonetheless have different last log blocks and the log buffer 112 with the larger last log block ID will be located before that having a smaller last log block ID. Additionally, this helps to ensure that if a log buffer is covered by another log buffer, the covering log buffer 112 is located before the covered log buffer 112 in the list. This algorithm for adding a log buffer 112 can be used in conjunction with the previously described algorithms for removing a log buffer 112 and searching for a log block, as well as other portions of the algorithm illustrating inserting a log buffer 112 described above.

When using the method just described for inserting a log buffer 112, an enhanced search algorithm may be used to tell whether a log buffer [Fb, Lb] is covered by any existing log buffer 112. In this example, search begins with a forward traversal, possibly followed by a backward traversal and possibly checking one or more covering log buffers. However, as noted in the previous example, some embodiments may be able to start with a backward traversal, possibly followed by a forward traversal, possibly followed by checking one or more covering log buffers.

If a last access point does not exist (e.g. no pointer to a last accessed log buffer 112 exists), the forward traversal starts from the head of the double linked list. Otherwise, the forward traversal starts from the last access point. At each log buffer [Fz, Lz] encountered during the forward traversal:

---

If Fb >= Fz and Lb <= Lz, terminate search and report that the log block is covered;
    else, if Fb >= Fz, traversal steps to the next log buffer in the double linked list;
        else (Fb < Fz), stop forward traversal;

---

If the forward traversal steps beyond the tail of the list, the backward traversal starts from the tail of the list. Otherwise, the backward traversal starts from the log buffer just preceding where the forward traversal was stopped. At each log buffer 112 [Fz, Lz] encountered during the backward traversal:

---

If Fb >= Fz and Lb <= Lz, terminate search and report that the log block is covered;
    else, if Fb < Fz, traversal steps to the previous log buffer 112 in the list;
        else (Fb >= Fz), stop backward traversal;

---

If the backward traversal steps beyond the head of the list, i.e. Fb is smaller than the first log block ID of all log buffers, the search is terminated and report indicating that [Fb, Lb] is not covered is issued. Otherwise, suppose the backward traversal stops at [Fp, Lp], where Fp is the largest first log block ID which is smaller than Fb and if several log buffers have the same first log block ID Fp, the backward traversal has stopped at the last one among them, then embodiments check all covering log buffers of [Fp, Lp]. In some embodiments, this is determined based on covering log buffers appearing in [Fp, Lp]'s covering list. If any covering log buffer 112 of [Fp, Lp] covers [Fb, Lb], the search is terminated and reports [Fb, Lb] is covered. Otherwise, the search is terminated and reports [Fb, Lb] is not covered by existing log buffers. Note that searching for a log block B can be fulfilled by this enhanced search algorithm to tell whether the log buffer [B, B] is covered by any existing log buffer 112.

Embodiments can further relax other assumptions and constraints from those illustrated previously herein. For example, even if a log buffer 112 is already covered by some existing log buffers, embodiments can nonetheless choose to insert it. When such a log buffer 112 is inserted, pointers to all covering log buffers are added, such as by, for example adding pointer into a covering list of this already covered log buffer 112.

For two log buffers with the same first log block ID, which implies one covers the other, some embodiments may not require the covering log buffer 112 to be located before the covered log buffer 112 in the list.

This caching mechanism does not exclude multiple concurrent users. Rather multiple concurrent users can access the cache 110 where each user maintains its own last access point.

While the embodiments illustrated herein have been applied to DBMS log ranges, it should be appreciated that this caching mechanism can be used generally to index other ranges. Thus, embodiments are not necessarily limited to only log ranges, but rather may be applied to other ranges in other embodiments.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
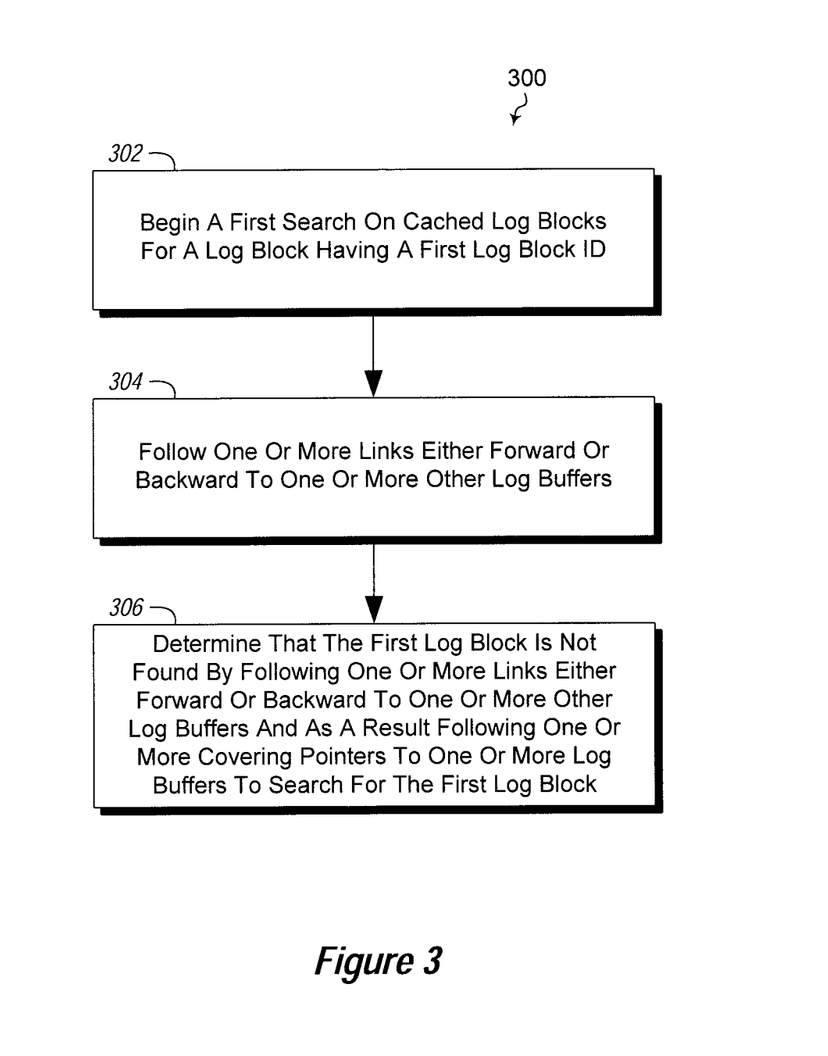
FIG. 3 illustrates a method of searching a log cache.

Referring now to FIG. 3, a method 300 is illustrated. The method 300 includes acts for searching cached log blocks for a log block. The method 300 includes beginning a first search on cached log blocks for a first log block having a first log block ID (act 302). The log blocks are cached and organized into sequentially ordered log buffers in memory. Adjacent sequentially ordered log buffers are double linked to each other, such as for example in some embodiments by a double linked list. Each log buffer includes a complete range of log blocks from a starting log block ID to an ending log block ID.

The method 300 further includes following one or more links at least one of forward or backward to one or more other log buffers (act 304). For example, as illustrated in FIG. 2, a forward traversal may be from log buffer 112-2 to 112-3. A backward traversal may be from log buffer 112-4 to 112-3. The direction of traversal may depend on how the log buffers are organized, what other traversals have already been performed, or other factors.

The method 300 further includes determining that the first log block is not found by following one or more links at least one of forward or backward to one or more other log buffers and as a result following one or more covering pointers to one or more log buffers to search for the first log block (act 306). For example, as illustrated in FIG. 2, log buffers 112-3, 112-4, 112-5 and 112-6 each include and/or can follow pointers to log buffer 112-2. In some embodiments, following one or more covering pointers to search for the first log block includes following a pointer stored in a list of covering pointers stored with a log buffer.

As noted, in some embodiments, adjacent log buffers are double linked in a double linked list. In some such embodiments, the first search may be started at a head of the double linked list. For example, a forward traversal portion of a search may be begun at log buffer 112-1, which is at the head of the double linked list.

Some embodiments may be implemented where the first search is started at a last access point based on where a previous search ended. For example, assume that a previous search had been done, and a log block had been found at log buffer 112-5. A subsequent search may begin at log buffer 112-5 rather than at the head (i.e. log buffer 112-1) or the tail (i.e. log block 112-7) of the list.

The method 300 may be performed where the one or more pointers are one or more pointers from a log buffer to one or more covering log buffers. The one or more covering log buffers have a range of log block IDs that overlap the log buffer which the one or more pointers are from. For example, log buffer 112-2 includes log blocks with log block IDs 30 through 120. This range includes 40 through 50, 60 through 70, 80 through 90, and 100 through 110 and therefore covers log buffers 112-3, 112-4, 112-5 and 112-6 respectively.

In some embodiments, following one or more links at least one of forward or backward to one or more other log buffers may include searches in both directions as outlined above. For example, in one embodiment, following one or more links at least one of forward or backward to one or more other log buffers may include first traversing forward through log buffers not having the first log block ID, until a log buffer has only log block IDs that are greater than first log block ID or until all possible log buffers have been searched following the forward direction, and then traversing in reverse through log buffers not having the first log block ID, until a log buffer has only log block IDs that are less than the first log block ID or until all possible log buffers have been searched following the reverse direction.

In an alternative embodiment, the double-linked list may be sorted in a descending order of the first log block ID of log buffers and a covering log buffer is located after its covered log buffers in the list, a reverse traversal may be performed first such that following one or more links at least one of forward or backward to one or more other log buffers includes first traversing in reverse through log buffers not having the first log block ID, until a log buffer has only log block IDs that are less than first log block ID or until all possible log buffers have been searched following the reverse direction, and then traversing forward through log buffers not having the first log block ID, until a log buffer has only log block IDs that are greater than the first log block ID or until all possible log buffers have been searched following the forward direction.

The method 300 may further include determining that the first log block is not found by following one or more covering pointers to search for the first log block. As a result, the method 300 may further include reading a log chunk containing the first log block from a log and caching the log chunk as an added log buffer. For example, a log chunk 106 with a desired log block 114 may be read from the log 102 when the log block 114 cannot be found in the cache 110, as illustrated in FIG. 1. Some such embodiments may further include determining if the added log buffer covers any other cached log buffers in that the added log buffer includes all log blocks included in another log buffer. If the added log buffer covers any other cached log buffers, pointers may be created from the covered log buffers to the added log buffer.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment a method of searching cached log blocks, the method comprising:
    performing a first search on cached log blocks cached in memory, wherein the log blocks are organized into sequentially ordered log buffers in memory, wherein adjacent sequentially ordered log buffers are linked to each other by one or more links between the ordered log buffers, and wherein each log buffer includes a complete range of log blocks from a starting log block identifier (ID) to an ending log block ID;
    satisfying the first search by finding a first log block in a first log buffer, wherein the first log block has a first log block ID that falls into a complete range of log block IDs in the first log buffer;
    performing a second search on the cached log blocks for a second log block having a second log block ID, the second search beginning at the first log buffer;
    as part of the second search determining the second log block is not in the first log buffer and following the one or more links at least one of forward or backward to one or more other log buffers; and
    determining that the second log block is not found by following one or more links at least one of forward or backward to one or more other log buffers and as a result following covering pointer from a log buffer to another covering log buffer to search for the second log block in the covering log buffer pointed to by the covering pointer, the covering log buffer covering one or more of the ordered log buffers by including all of the log blocks from the one or more of the ordered log buffers.

2. The method of claim 1, wherein adjacent log buffers are double linked in a double linked list.

3. The method of claim 2, wherein the first search is started at a head of the double linked list.

4. The method of claim 1, wherein the one or more covering pointers includes a pointer from a log buffer to a covering log buffer that has a range of log block IDs that entirely overlap the log buffer which the covering pointer is from.

5. The method of claim 1, wherein following one or more links at least one of forward or backward to one or more other log buffers comprises first traversing forward through log buffers not having the second log block ID, until a log buffer has only log block IDs that are greater than second log block ID or until all possible log buffers have been searched following the forward direction, and then traversing in reverse through log buffers not having the second log block ID, until a log buffer has only log block IDs that are less than the second log block ID or until all possible log buffers have been searched following the reverse direction.

6. The method of claim 1, wherein following one or more links at least one of forward or backward to one or more other log buffers comprises first traversing in reverse through log buffers not having the second log block ID, until a log buffer has only log block IDs that are less than second log block ID or until all possible log buffers have been searched following the reverse direction, and then traversing forward through log buffers not having the second log block ID, until a log buffer has only log block IDs that are greater than the second log block ID or until all possible log buffers have been searched following the forward direction.

7. The method of claim 1, further comprising determining that the second log block is not found by following a covering pointer to search for the second log block, and as a result, reading a log chunk containing the second log block from a log and caching the log chunk as a second log buffer.

8. The method of claim 7, further comprising, determining if the second log buffer covers any other cached log buffers in that the second log buffer includes all log blocks included in another log buffer, and if the second log buffer covers any other cached log buffers, then creating pointers from the covered log buffers to the second log buffer.

9. The method of claim 1, wherein following a covering pointer to search for the second log block comprises following a pointer stored in a list of covering pointers stored with a log buffer.

10. One or more computer readable media comprising computer executable instructions that when executed by one or more processors cause one or more processors to perform the following:
    performing a first search on cached log blocks for a log block having a first log block ID, wherein the log blocks are cached and organized into sequentially ordered log buffers in memory, wherein adjacent sequentially ordered log buffers are linked to each other by one or more links between the ordered log buffers, and wherein each log buffer includes a complete range of log blocks from a starting log block identifier (ID) to an ending log block ID;
    as part of the first search searching a first log buffer and then following the one or more links at least one of forward or backward to one or more other log buffers; and
    determining that the first log block is not found by following one or more links at least one of forward or backward to one or more other log buffers and as a result following a covering pointer from a log buffer to a covering log buffer to search for the first log block, the covering log buffer covering one or more of the ordered log buffers by including all of the log blocks from the one or more of the ordered log buffers.

11. The computer readable media of claim 10, wherein adjacent log buffers are double linked in a double linked list.

12. The computer readable media of claim 11, wherein the first search is started at a head of the double linked list.

13. The computer readable media of claim 10, wherein the first search is started at a last access point based on where a previous search ended.

14. The computer readable media of claim 10, wherein the one or more covering pointers are one or more pointers from a log buffer to one or more covering log buffers that have a range of log block IDs that entirely overlap the log buffer which the one or more cover pointers are from.

15. The computer readable media of claim 10, wherein following one or more links at least one of forward or backward to one or more other log buffers comprises first traversing forward through log buffers not having the first log block ID, until a log buffer has only log block IDs that are greater than first log block ID or until all possible log buffers have been searched following the forward direction, and then traversing in reverse through log buffers not having the first log block ID, until a log buffer has only log block IDs that are less than the first log block ID or until all possible log buffers have been searched following the reverse direction.

16. The computer readable media of claim 10, wherein following one or more links at least one of forward or backward to one or more other log buffers comprises first traversing in reverse through log buffers not having the first log block ID, until a log buffer has only log block IDs that are less than first log block ID or until all possible log buffers have been searched following the reverse direction, and then traversing forward through log buffers not having the first log block ID, until a log buffer has only log block IDs that are greater than the first log block ID or until all possible log buffers have been searched following the forward direction.

17. The computer readable media of claim 10, further comprising determining that the first log block is not found by following one or more covering pointers to search for the first log block, and as a result, reading a log chunk containing the first log block from a log and caching the log chunk as an added log buffer.

18. The computer readable media of claim 17, further comprising, determining if the added log buffer covers any other cached log buffers in that the added log buffer includes all log blocks included in another log buffer, and if the added log buffer covers any other cached log buffers, then creating pointers from the covered log buffers to the added log buffer.

19. The computer readable media of claim 10, wherein following one or more covering pointers to search for the first log block comprises following a pointer stored in a list of covering pointers stored with a log buffer.

20. A computing system comprising:
one or more processors;
one or more computer readable media coupled to the one or more processors, wherein the one or more computer readable media comprise computer executable instructions that when executed by one or more of the one or more processors, cause one or more processors implement functionality for performing a first search on cached log blocks for a log block having a first log block identifier (ID), wherein the log blocks are cached and organized into sequentially ordered log buffers in memory, wherein adjacent sequentially ordered log buffers are linked to each other in a linked list, and wherein each log buffer includes a complete range of log blocks from a starting log block ID to an ending log block ID, wherein the one or more computer readable media comprise:
computer executable instructions that when executed by one or more processors cause one or more processors to determine if a last access point exists tracking a last accessed log buffer based on a previous search of cached log buffers, and if a last accessed pointer to a last accessed log buffer exists, starting a search at the last accessed log buffer; and if a last accessed pointer to a last accessed log buffer does not exist, starting a search at a head or tail of the linked list;
computer executable instructions that when executed by one or more processors cause one or more processors to perform searching functionality following one or more links forward or backward to one or more other log buffers searching for a log block with a log block ID and terminating a search and reporting a log block found if a log buffer is found where the log block ID is greater than or equal to a beginning log block ID for the log buffer and less than or equal to an ending log block ID for the log buffer; and
computer executable instructions that when executed by one or more processors cause one or more processors to perform searching functionality following one or more covering pointers to one or more log buffers to search for a log block, wherein each pointer is a pointer from a log buffer to a covering log buffer, wherein the covering log buffer has a range of log block IDs that overlap the log buffer which the pointer is from.

21. The method of claim 1, wherein the memory comprises the memory of a database management system and wherein the log blocks are written to the memory from a log that is stored in a persistent storage associated with the database management system.

* * * * *